Oct. 7, 1930. R. F. WALTERS Re. 17,823

UPHOLSTERY INSTALLATION

Original Filed July 24, 1924

Inventor:
Rollo F. Walters
by Emery, Booth, Varney & Townsend
Attys

Reissued Oct. 7, 1930 Re. 17,823

UNITED STATES PATENT OFFICE

ROLLO F. WALTERS, OF DETROIT, MICHIGAN, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

UPHOLSTERY INSTALLATION

Original No. 1,760,259, dated May 27, 1930, Serial No. 727,958, filed July 24, 1924. Application for reissue filed June 26, 1930. Serial No. 464,090.

This invention aims to provide an improved detachable upholstery installation and fastening elements for use therewith.

Reference is hereby made to my divisional application Serial No. 333,908, filed January 21, 1929.

In the drawings, which illustrate a preferred and two modified forms of my invention:—

Referring to the preferred form of my invention, as illustrated in Figs. 1 through 5, I have shown (Fig. 1) an automobile door 1 having a frame part 2, to which are secured a plurality of socket-engaging studs. Beneath each stud, I have provided in the frame part 2, an aperture $2^a$ which in this instance serves as a guide in positioning the studs on the frame 2, so that they will be in the proper position for engagement with eyelets on the upholstered part.

These apertures $2^a$ may also be used for stud-receiving apertures when the upholstered part is provided with stud members. Thus the apertures $2^a$ may be used for either of the purposes mentioned above, but I prefer in this invention to use them as markers for positioning the studs on the frame part 2.

Figure 1:
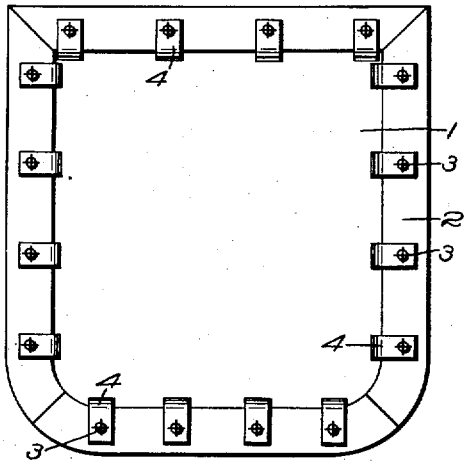
Figure 1 is an elevation view of the inside of an automobile door, showing the shiftable studs positioned upon the frame of the door.
Figure 2:
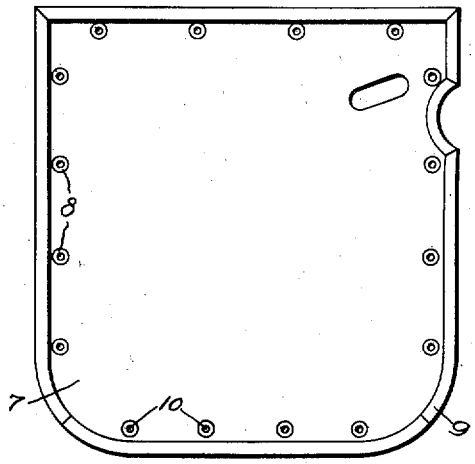
Fig. 2 is an inside elevation of the upholstery installation.
Figure 3:
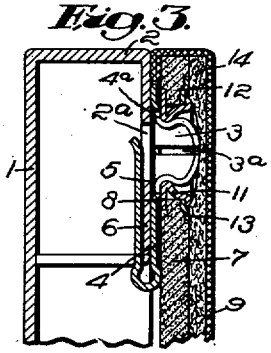
Fig. 3 is a longitudinal section through a portion of the door showing one of the studs with the upholstered installation secured thereto.

Each stud is pressed from a single sheet of metal (Figs. 4 and 5) and presents a contractible and expansible head 3, a base 4 and an underlying spring finger 5 formed from the base 4. When secured to the frame part 2 of the door, the base of the stud lies against the front web 6 of the frame part 2 and the spring finger 5 slips over the edge of the frame part and bears against the under side of the web 6, thus permitting the stud to be shifted transversely relative to the frame part 2, while the stud may be held in the desired position by the spring finger 5, as best illustrated in Fig. 3.

Figure 5:
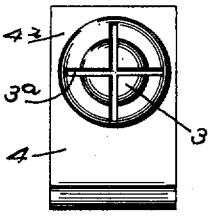
Fig. 5 is a front elevation of a preferred form of removable stud.

The heads of the studs have slots $3^a$, which extend from the head of each stud a substantial distance into the raised portion $4^a$ (Fig. 3) of the base 4 of the stud to permit bending of the contractible and expansible parts of the stud upon straight lines, between the slots, which do not intersect the head of the stud, as illustrated in Fig. 5. Thus the raised portion $4^a$ of the stud permits the head of the stud to contract and expand without interfering with the web 6 of the frame 2 of the door.

The upholstered part for covering that side of the door at which the studs are secured, comprises a backing 7 of substantially rigid material, such as cardboard or the like, a plurality of sockets or eyelets 8 and a flexible covering 9 of fabric, leather or the like at one side of the backing 7.

Figure 4:
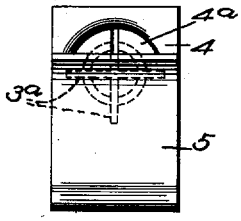
Fig. 4 is a rear elevation of the preferred form of removable stud.

Each eyelet 8 presents a stud-receiving aperture 10 and a rivet part 11, which extends through an aperture 12 in the backing 7 and is clenched over a clench washer 13 at the opposite side of the backing, as best illustrated in Fig. 4. The rivet part of the eyelet flares outwardly back of the stud-receiving aperture, thereby to provide a recess into which the head of the stud fits when a stud is engaged with the eyelet.

When the eyelets 8 are all secured to the backing 7, a padding 14 is placed over the surface of the backing at that side thereof at which the clench washers are exposed. Then the flexible covering 9 is stretched over the padding 14 and secured to the opposite side of the backing in any suitable manner. Thus the upholstered part is provided with a neat and finished covering, which conceals all the parts of the fasteners when the upholstered part is secured to the frame.

The upholstered part may be secured to the frame of the door by placing it against the studs and pressing the sockets or eyelets 8 into engagement therewith, thus drawing the edges of the upholstered part against the frame to provide a smoothly fitting edge which fits tightly against the surface of the frame part 2 of the door 1, as illustrated in Fig. 3.

If for any reason any of the sockets do not register with the studs when the upholstered part is being secured to the door, the studs may be shifted transversely relative to the frame until they do register with the eyelets 8 which are then pressed into engagement therewith. Thus the upholstered part may be fitted to the door, by shifting the studs until the edges of the upholstered part align with the edges of the door 1.

Figure 6:
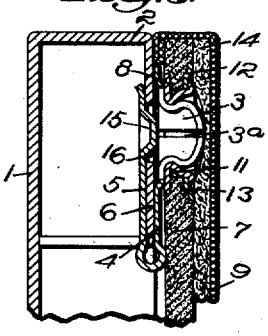
Fig. 6 is a section similar to Fig. 3, showing a modified form of stud secured to the door frame.
Figure 7:
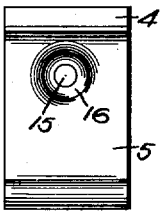
Fig. 7 is a rear elevation of the modified form of removable stud shown in Fig. 6.

Referring now to Figs. 6 and 7, I have shown a modified form of stud for use in upholstery installations.

This stud is substantially as shown and described in connection with the preferred form of my invention, except that it is provided with a detent 15 which is pressed from the spring finger 5 and engages the aperture $2^a$ in the front web 6 of the frame part 2 of the door, as illustrated in Fig. 6.

The detent 15 is preferably cone-shaped, so as to provide a cam-shaped surface 16 for disengaging the stud from the aperture $2^a$ by moving the stud in any transverse direction relative to the frame part 2. The cross-section of the detent is substantially smaller than the cross-section of the aperture $2^a$, as illustrated in Fig. 3, thereby to permit transverse shifting of the stud for alignment with its cooperating eyelet 8 in the upholstered part.

Figure 8:
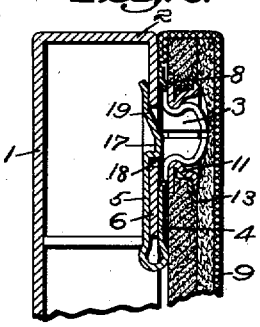
Fig. 8 is a section similar to that shown in Fig. 6, showing a second modified form of removable stud.
Figure 9:
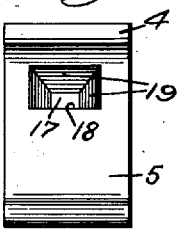
Fig. 9 is a rear elevation of that form of removable stud shown in Fig. 8.

Referring now to the modified form of stud, as illustrated in Figs. 8 and 9, I have shown a stud substantially as shown and described in connection with the modified form of my invention shown in Figs. 6 and 7.

In this instance, however, the detent 17, for engagement with the aperture $2^a$ in the frame part 2, is so formed as to present a straight wall 18 at that side thereof toward the inner edge of the frame part 2, thereby to provide a stop to prevent disengagement of the stud from the frame by a pull at that side thereof. The other sides of the detent 17 are provided with cam surfaces 19 to permit separation of the stud from the frame by moving the stud lengthwise of the frame until the detent is free from the aperture $2^a$. Then the stud may be removed from the frame.

While I have shown and described preferred and modified forms of embodiments of my invention, it will be understood that changes involving omission, substitution, alteration and reversal of parts, and even changes in the mode of operation, may be made without departing from the scope of my invention, which is best defined in the following claims.

Claims:

1. A frame for reception of an upholstered installation, said frame including a plurality of apertures and a plurality of studs having clip-like base portions presenting detent means for engagement in said apertures, said detent means substantially smaller in cross-section than the cross-section of said apertures thereby to permit said studs to shift in any transverse direction relative to said frame.

2. A frame for reception of an upholstered installation, said frame including a plurality of apertures, a plurality of studs cooperating with said apertures, each of said studs having a base presenting a contractible and expansible socket-engaging head, a spring finger underlying said base to hold said stud in position upon said frame and a detent presented by said spring finger for engagement with one of said apertures in said frame, said detent substantially smaller in cross-section than said aperture, thereby to permit transverse movement of said stud relative to said frame.

3. An upholstery installation comprising, in combination, a frame, a plurality of studs having clip-like base portions securing them to said frame, an upholstered backing presenting stud-receiving means engaged with said studs, thereby holding said upholstered backing to said frame and means providing a lost motion connection between the frame and the cliplike base portion of a stud thereby permitting shifting of said stud in any transverse direction relative to said frame for alignment with its cooperating stud-receiving means.

4. An upholstery installation comprising, in combination, a frame part, an upholstered backing part to be secured to said frame part and separable snap fastening means securing said parts together, said separable snap fastening means including a plurality of members having U-shaped clip-like base portions securing them to one of said parts by engagement with opposite sides of said part and means providing a lost motion connection between each clip-like base portion and the part to which it is attached, thereby permitting shifting of the cliplike portion in any transverse direction relative to said part for alignment of the fastening means carried by said clip-like portions with the fastening means carried by the other of said parts thereby to be secured together.

5. An upholstery installation comprising, in combination, a frame part, an upholstered backing part to be secured to said frame part and separable snap fastening means securing said parts together, said separable snap fastening means including a plurality of members having U-shaped clip-like base portions securing them to one of said parts by engagement with opposite sides of said part, means providing a lost motion connection between each clip-like base portion and the part to which it is attached, thereby permitting shifting of the clip-like portion in any transverse direction relative to said part for alignment of the fastening means carried by said clip-like portions with the fastening means carried by the other of said parts thereby to be secured together and detent means provided on each of said clip-like base portions for cooperation with apertures in the part to which the clip-like base portions are secured to provide accidental removal or displacement while permitting free shifting of the clip-like base portions.

ROLLO F. WALTERS.